UNITED STATES PATENT OFFICE.

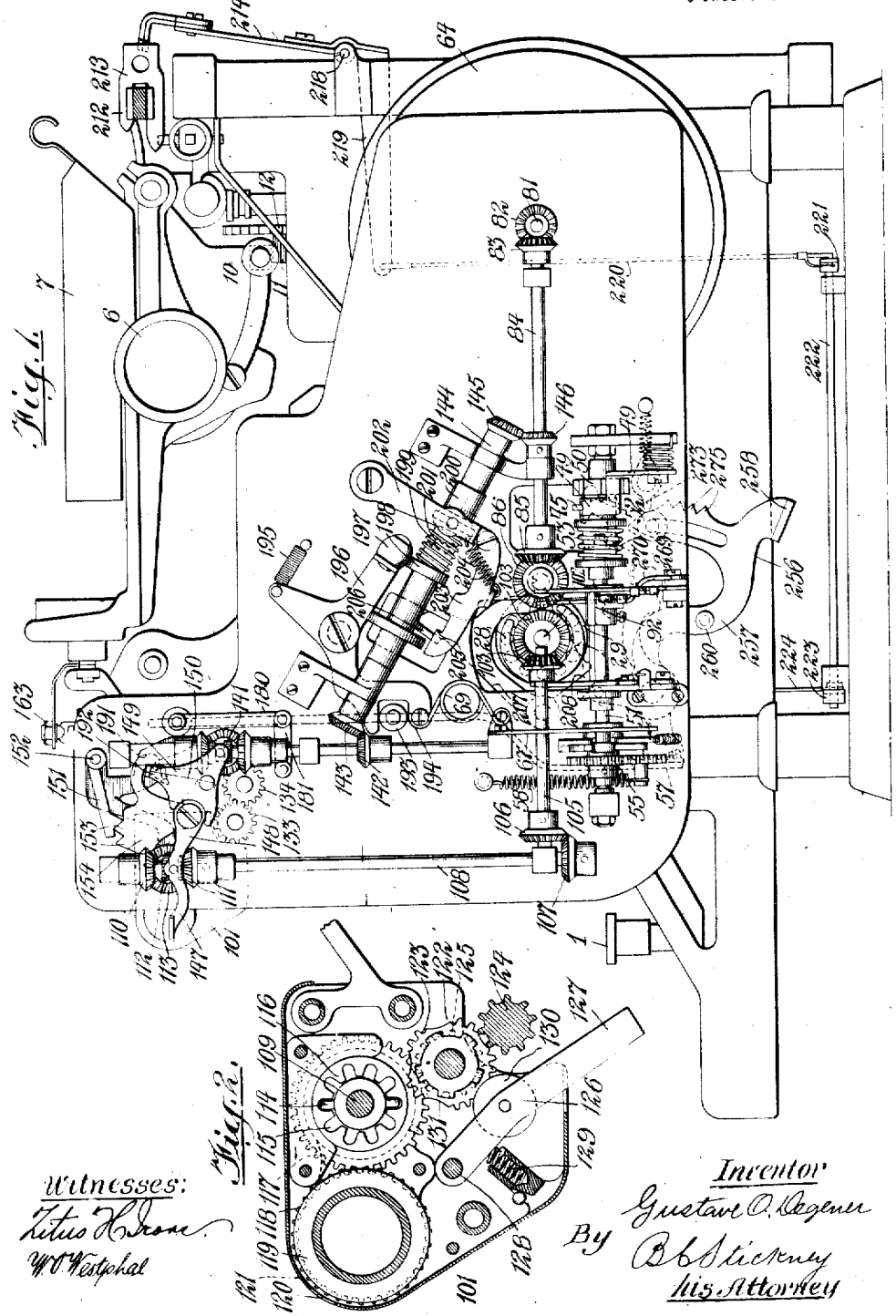

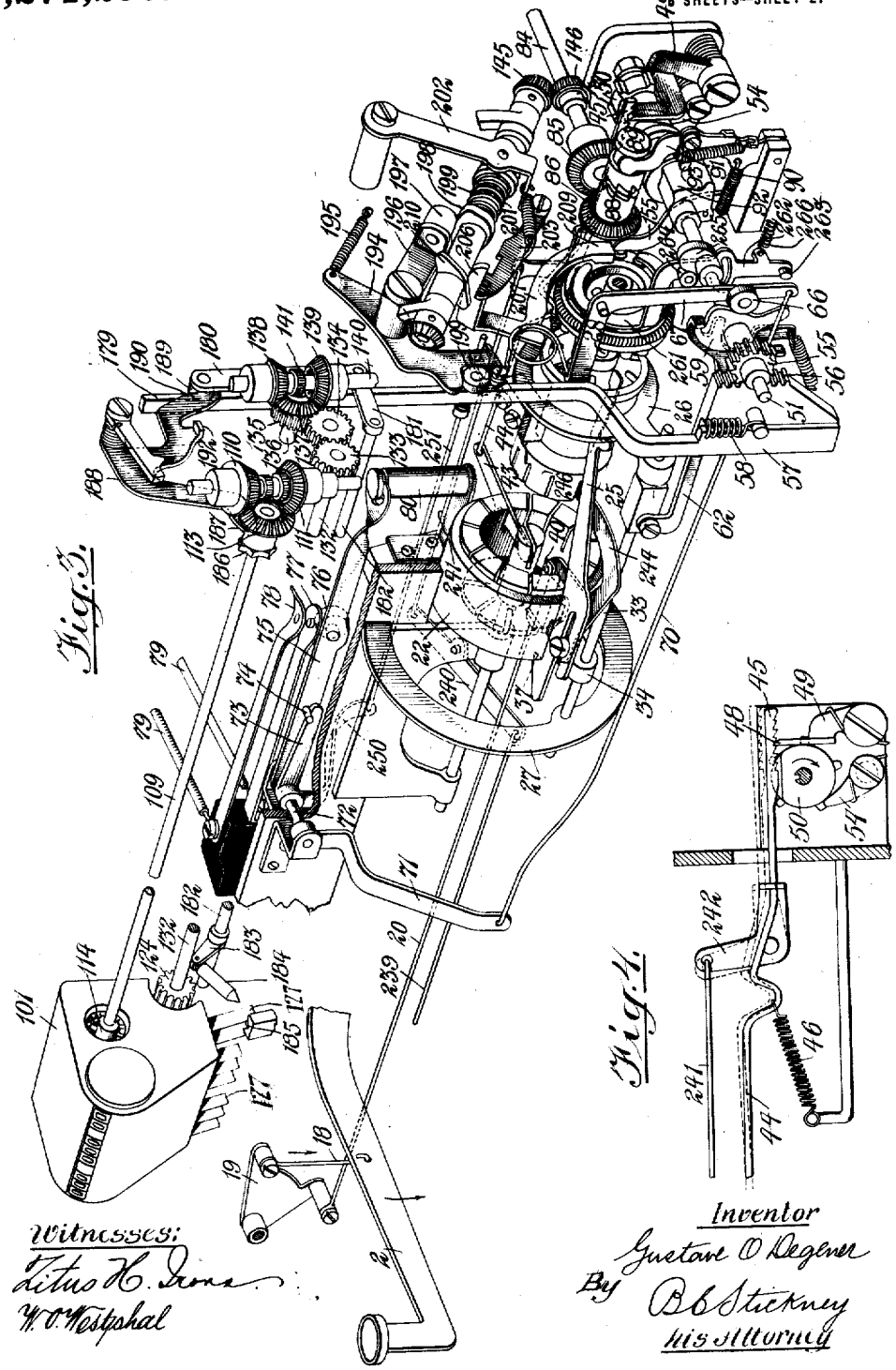

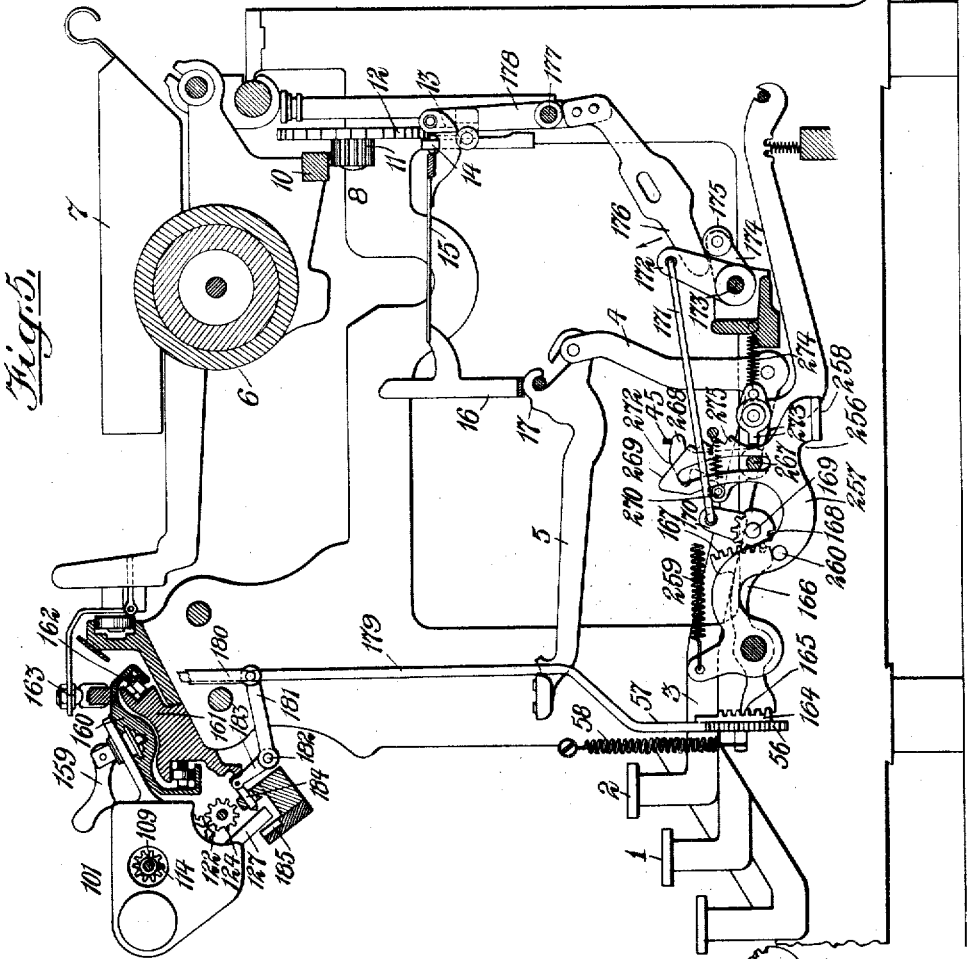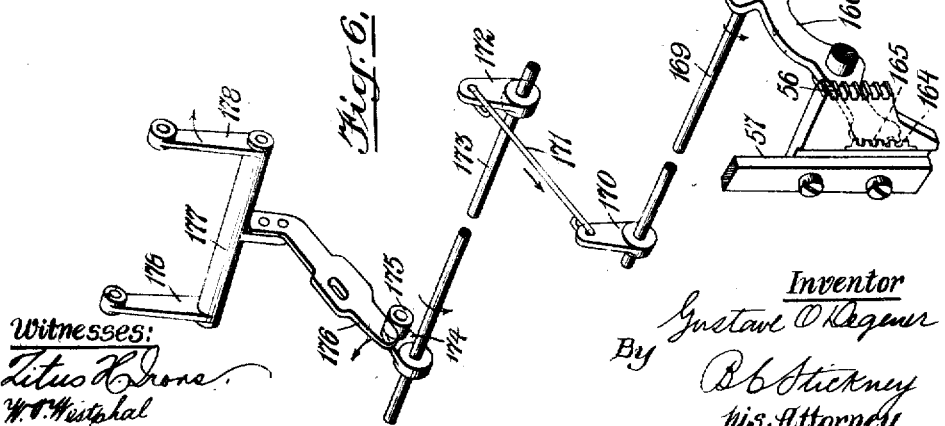

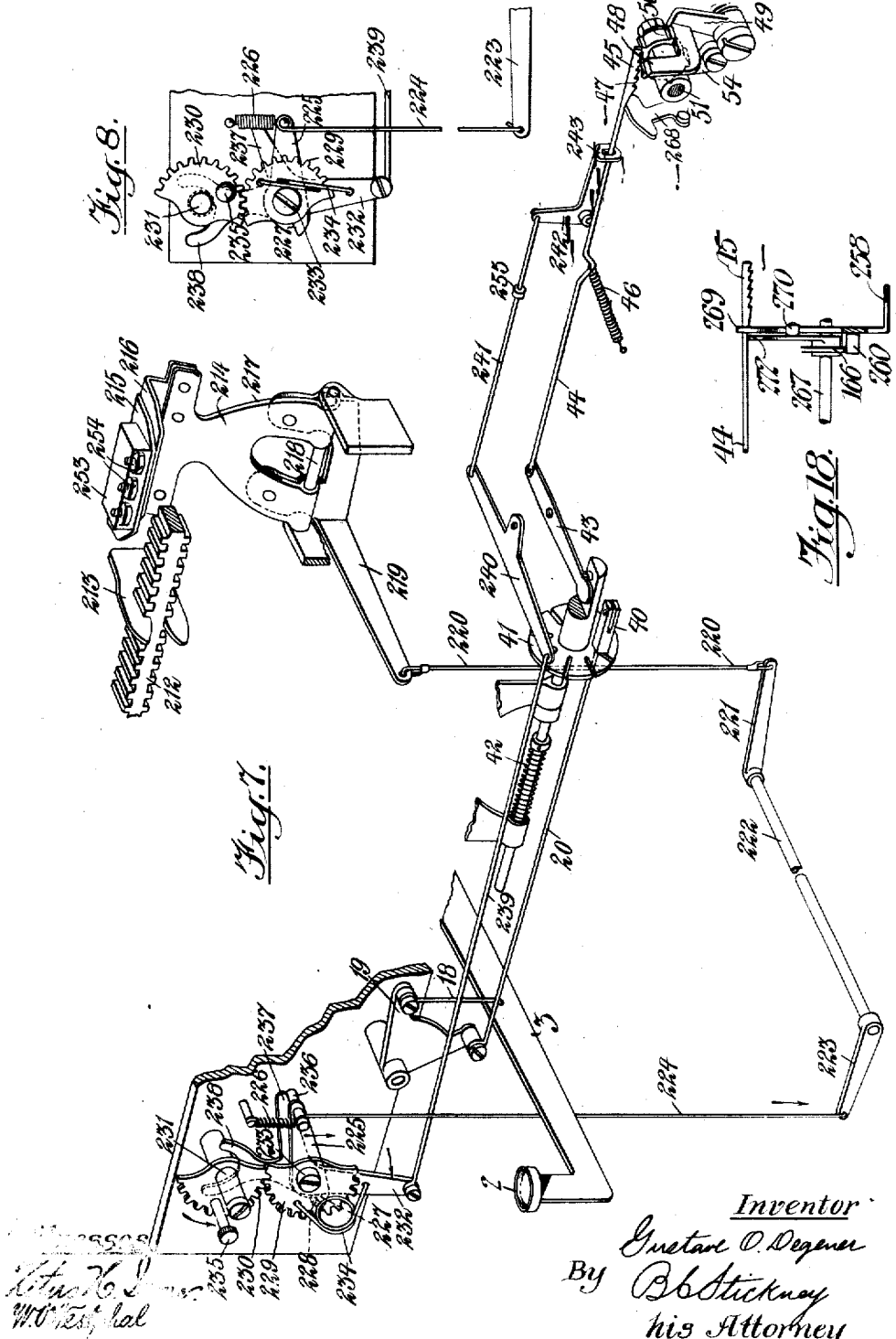

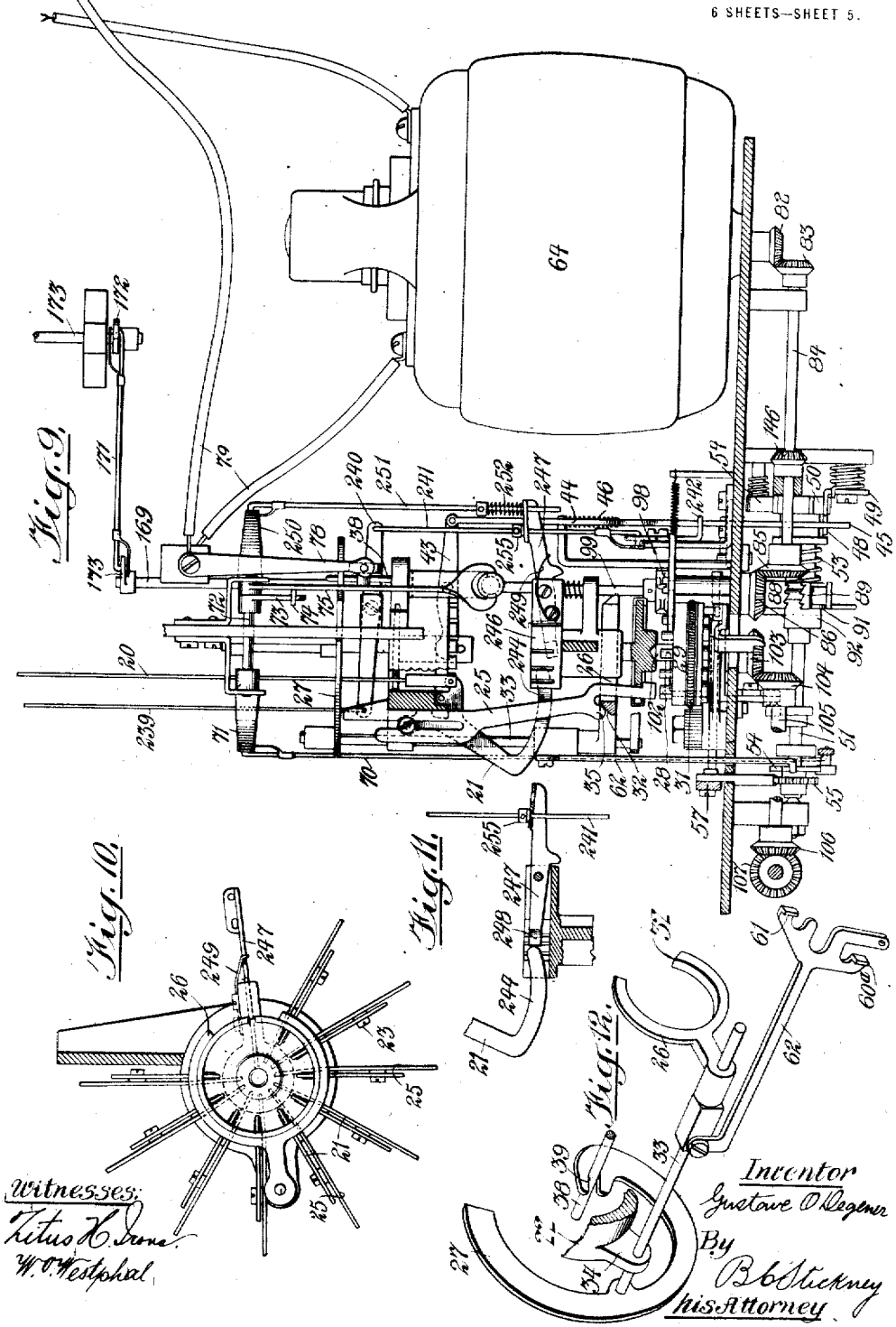

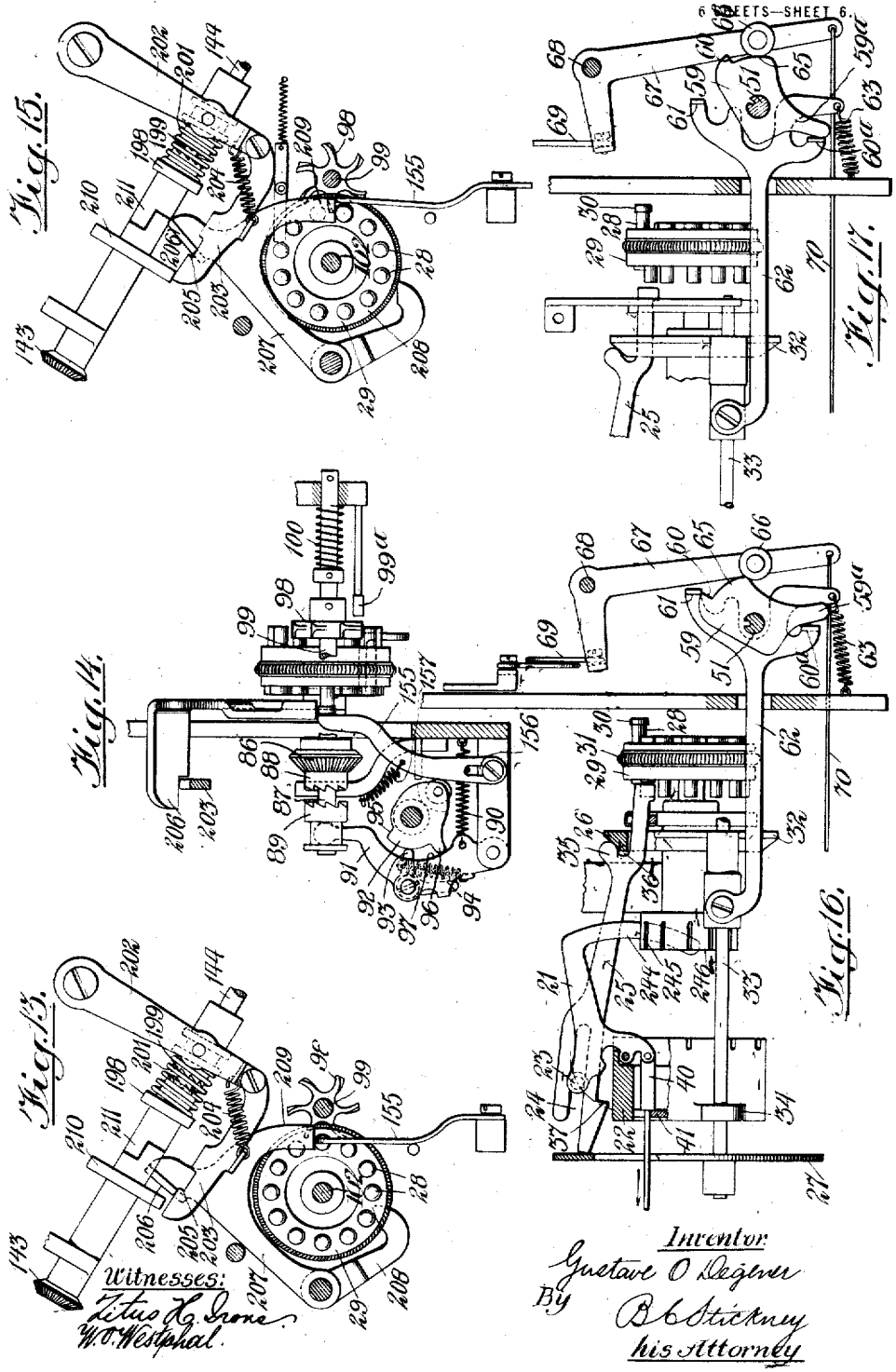

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,271,290.          Specification of Letters Patent.          Patented July 2, 1918.

Application filed November 15, 1913. Serial No. 801,109.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to a combined typewriting and computing machine of the general type in which a typewriting and a computing action may be carried on concomitantly under the control of a single set of numeral keys, and is an improvement on my co-pending application filed March 10, 1913, No. 753,254.

In this general type of machine, the numeral keys when actuated operate type actions to print numbers, and, at the same time, enable the setting of index pins in a valuating mechanism to determine the extent of rotation of computing wheels of one or more computing heads by a source of power to correspond with the particular numeral keys struck. In the present case the numeral keys are used to select the particular pins to be set, and are connected to bring into play automatic power-actuated mechanism for performing the actual work of setting the pins, and thus relieving the numeral keys of this burden. By this means also, the numeral keys can be freely actuated without actually setting the index pins unless the source of power mentioned is brought into play.

In the present invention the operative effectiveness of the numeral keys to set in motion the computing mechanism, is governed by the shifting between effective and ineffective positions of a light tripper, which is universally actuable by all of the numeral keys. This tripper is controlled from the carriage as to its effective and ineffective positions, to correspond with non-computing portions of the travel of the typewriter carriage and with computing zones in the travel of the typewriter carriage. This tripper controls the bringing into play of the source of power, so that when the tripper is in its ineffective position, the source of power cannot be rendered effective to set the pins, and, hence, the numeral keys may be actuated to typewrite without bringing the computing mechanism into play. The effectiveness of the tripper while governed from the carriage by automatic mechanism acting to determine computing zones, may be silenced or rendered effective at will by manual controlling means.

When a numeral key is once started in action for the running up of a number on one or more computing heads, it is essential that the traveling elements of the computing heads, such as the master wheel or the set of computing wheels, should be locked against travel to prevent any incorrect or obstructive action. It is likewise advisable to lock the typewriter carriage, which controls in a way the movements of the traveling elements of the computing head. Hence, in this invention means is provided for locking the traveling elements of the computing head and the traveling typewriting carriage against a feeding movement just as soon as a numeral key is struck.

Inasmuch as the computing wheels are normally locked individually against accidental rotation, connections are provided whereby the same locking means for the traveling element of the computing head releases the individual lock for the computing wheel in register with the master wheel, whereby this computing wheel will be relieved of the drag of its locking pawl.

Further, in order that other numeral keys may not be actuated to start a new computation until the computation under way is completed, there is provided a locking mechanism which positively prevents any of the numeral keys from being actuated until the running up of a number once started is entirely completed. This applies not only to the other numeral keys but also to the one just struck, as this locking means is supplementary to the locking means connected to each numeral key, taking the place of the same just so soon as the numeral key is returned to its normal position and remaining in action until the current computing action taking place ceases. This last-mentioned locking means is also used to prevent an actuation of any other key after one has been struck, in case the electric motor is not connected to the source of power. That is to say, the striking of a numeral key brings the supplementary locking means into action, but the rotation of the motor withdraws it from its effective position. Hence, if the motor is not rotated, the lock will remain in its effective position, so that no other numeral key can be subsequently struck, thereby warning the operative that the machine is not connected up to its source of power.

The same supplementary lock is also used to prevent the actuation of a numeral key in digit or denominational columns corresponding to the writing of other characters than numbers. This is more especially applied to the denominational columns corresponding to the decimal point, the space between hundreds and thousands, thousands and millions, etc.

If, for any reason, the computing mechanism should be but partially actuated, as in the case where the motor is disconnected from its source of current, it is necessary to restore it to cleared condition ready to receive a computation. For this purpose, a manually-operable key or lever, which may be termed a "restoring member", is provided, whereby the supplementary locking means above mentioned is returned to its ineffective position, and any index pins which may happen to have been set, with the exception of the one forming the break in the drive to the motor, if still set, are restored to their unset position.

In the present invention, means is provided for normally locking the master wheel against accidental movement when not actually being driven to run up a number. The locking means which effects this detaining of the master wheel is, however, released at the actuation of any numeral key under the control of the power mechanism, which locks the traveling element and which sets the index pins. In other words, those parts, such as the computing wheels and the master wheel, which are normally locked, are released at the striking of a numeral key, while those parts which are free to travel, such as the carriage and the traveling element of the computing head, are locked against traveling movement at the striking of a numeral key.

The computing head or heads are connected individually to be driven in either one direction or the other for addition or subtraction, and also not to be driven at all when the master wheel will be disconnected from the computing mechanism. In this neutral condition of the computing heads, the locking means for the master wheel is normally held in play, so that it will not be released even when a numeral key is struck.

Other features and advantages will hereinafter appear.

In the accompanying drawings

Figure 1 is a diagrammatic section taken from front to rear of the machine.

Fig. 2 is a section taken through one of the computing heads.

Fig. 3 is a skeleton perspective view, showing the connection of one of the numeral keys to the valuating and other computing mechanism and the relation of the latter to the computing heads.

Fig. 4 is a detail view in vertical section, showing the tripper for bringing the auxiliary source of power into play, whereby the index pin is set thereby at the actuation of a numeral key. This view shows in full lines, the silencing means for the tripper in its position to bring the tripper into action, and in dotted lines, in its position to silence the tripper.

Fig. 5 is a vertical skeleton section taken from front to rear, showing the connection of the computing head to the typewriter carriage and the traveling support for the former, and also showing the restorer or restoring lever whereby the computing mechanism may be cleared manually.

Fig. 6 is a skeleton perspective view, showing the means for locking the carriage against movement during a computing action.

Fig. 7 is a skeleton perspective view, showing how the tripper is controlled in its effectiveness from the carriage, so as to be effective during a computing zone or column as determined by the travel of the carriage. This view also shows the means whereby the tripper may be controlled manually.

Fig. 8 is a view of the controlling means for the tripper, showing the same shifted manually to render the tripper ineffective.

Fig. 9 is a detail plan view, with parts broken away to show the underlying structure and with parts omitted for the sake of simplicity.

Fig. 10 is a detail vertical section, showing the relation of the locking blades and the pin-setting interponents.

Fig. 11 shows a detail horizontal section of the supplementary locking means whereby the numeral keys may be locked against actuation when the motor is silent, when a comma or decimal-point space is opposite the printing point of the typewriting mechanism, and when a computation has been started and not completely finished.

Fig. 12 is a detail perspective view of the cradle for carrying and actuating the pin-setting interponents.

Fig. 13 is a detail view of the clutch connection whereby the supplementary source of power reënergized from the motor at the completion of each computing operation and whereby the supplementary mechanism brought into play at the actuation of the numeral key is reset for action.

Fig. 14 is a detail vertical section showing the means for connecting the valuating or index wheel with the source of power and also showing the means for resetting the previously-set pin. This mechanism is all shown in its silent position ready to be brought into play.

Fig. 15 is a detail view similar to Fig. 13, with the exception that the valuating wheel has rotated to enable the shifter to connect up the clutch when the valuating wheel comes to its home position, which it has not quite reached in this figure.

Fig. 16 is a detail view of the pin-setting mechanism, showing one of the interponents in its setting position and in the act of completing the setting of the apposite pin under the drive of the cradle or hammer; the flange 61 has just escaped from the shoulder 60, so that the slide 62 and connected parts are just about to be returned.

Fig. 17 is a view similar to Fig. 16, but showing the mechanism in a slightly advanced state where the hammer or cradle has escaped from its actuating means and is returning while the circuit-closing and supplementary-lock-controlling lever is completely actuated to energize the motor and set the supplementary lock to its ready position.

Fig. 18 is a detail view in front elevation of the restorer for unsetting any pins which have been improperly set and for restoring the computing mechanism to a normal condition ready to start a computation.

Alphabet keys 1 and numeral keys 2, depress levers 3 to rock bell cranks 4, and swing type bars 5 up rearwardly against the front side of a platen 6 mounted on a carriage 7. The carriage 7 travels under the traction of a spring barrel, not shown, and under the control of an escapement mechanism indicated in general at 8. This escapement mechanism includes a rack 10 mounted for swinging movement on the carriage 7 and engaging a pinion 11 connected to and to be controlled by an escapement wheel 12, which is engaged by a loose dog 13 and a fixed dog 14. The dogs 13 and 14 are rocked at the actuation of any of the alphabet or numeral keys, by a universal frame 15, which has a universal bar 16 engageable by a heel 17 on each of the type bars 5. Attention is called to the fixed dog 14, which, when a key is actuated, comes into engagement with the escapement wheel 12, as this dog is used to lock the carriage 7, as will subsequently be described, when a computing action is started by the striking of a numeral key, and hold it locked until the computing action has been completed.

The numeral keys 2 not only operate the type bars to write numbers, but also are connected to a computing mechanism to enable the computation of the numbers to which they correspond. For this purpose, each numeral key lever 3 has connected thereto a link 18 (Fig. 7), connected, at the depression of each numeral key, to rock a bell crank 19, which in turn draws on a link 20 to rock a lever 21 (Fig. 16) pivotally mounted in a hub 22. There is one of these levers for each numeral key from "1" to "9". Each lever 21 is provided with a pin or lug 23 engaging in a slot 24 provided in an interponent 25. There are a series of these interponents 25 corresponding to the numeral keys "1" to "9" and they are floatingly mounted by a cradle 26 and the pins 23. The cradle 26 acts also as a hammer or striker, to force in the particular one of the interponents 25 which happens to be shifted to the Fig. 16 position by the actuation of the accordant numeral key 2 and the accordant lever 21.

Normally, the interponents are located with the tail ends thereof clear of the hitting head or ring 27 of the cradle 26, so as to be unaffected thereby. However, when any one of the numeral keys is actuated, it swings its lever 21 to rock the accordant interponent to the position indicated in Fig. 16, where it will lie in the path of the head 27, so as to be advanced from the Fig. 9 position to the Fig. 16 position, forcing before it the apposite one of a series of index pins 28 settably mounted in apertures on a valuating wheel 29. The pins 28 are headed at 30, so that they are returned to a definite position on the wheel 29 and are detained in their adjusted position by a circumferential spring 31. The pins 28 determine, by their distance from a gap in the valuating wheel 29 formed by the previously set pin, the extent of rotation of this valuating wheel 29, and thus, in a way, control the value of a computation or the magnitude thereof to correspond with the particular numeral key 2 actuated.

Considering the specific form of cradle or hammer 26, it will be seen by reference to Figs. 12 and 16, that it includes a forward ring 32 secured to a rod 33 slidingly mounted in a lug 34 on the hub 22, and the head or ring 27 also secured on the rod 33. It will be noted that the forward ring 32 is beveled so as to form a fulcrum support for the interponents 25, which are each provided with an offset 35, to form between this offset and the body of the interponent, a socket or notch 36 embracing the beveled circumference of the ring 32. This enables the interponents 25 to be easily rocked between their effective and ineffective positions while being supported for movement with the cradle 26. The rear end of each interponent 25 is provided with an offset or shoulder 37 to engage the corner of the hub 22 and maintain each interponent in its position of rest without a movement with the cradle.

The head 27 may be guided to prevent it turning on the rod 33, by a pin 38 passing through an opening 39 in the head. The head 27 need not be in form a complete ring, as the series of interponents 25, of which there are nine, one for each of the numeral keys from "1" to "9," occupies but a portion of a complete circumference.

The numeral keys 2 do not themselves furnish the power for advancing the interponents 25 to set the pins 28. This is done from a supplementary source of power. To accomplish this, each of the links 20 is provided, at its point of attachment with the corresponding lever 21, with an enlargement 40, to engage a disk 41 having a series of slots, through which the links 20 extend (Fig. 7). This disk 41 will then be slid rearwardly against the tension of a spring 42 at the actuation of any numeral key, so that a lever 43 connected to the disk 41 will be rocked to thrust forward a link 44 bearing at its forward end a tripper 45. The link 44 and the tripper 45 are moved forward against the tension of a spring 46, which will return them after the numeral key has been restored.

The tripper 45 bears on its own surface a serrated or toothed portion 47 arranged, when the tripper is in its effective depressed position, to engage a pointed toe 48 on a detent 49. The detent 49 engages a toothed ratchet wheel 50, loosely mounted on a shaft 51. The shaft 51 is normally under a tension to rotate as will be explained, but is held by the detent 49 until the latter is disengaged from the toothed wheel 50 by the tripper 45. This disengagement, as will be seen, takes place at the sliding motion of the disk 41, and thus at the actuation of any numeral key.

While the ratchet wheel 50 is not fixed to the shaft 51, it is connected by a clutch 52, one part of which is splined on the shaft 51 and the other part of which is secured to the ratchet wheel 50. The clutch is a one-way acting clutch and the parts are normally held in engagement with each other by a spring 53, so that normally the shaft 51 will be prevented from rotating in the direction in which it is normally urged, until the detent 49 has been released. The clutch arrangement, however, enables the shaft 51 to be rotated in a counter-direction relatively to the ratchet wheel 50, as the latter is held from counter-rotation by a dog 54.

To rotate the shaft 51, it is provided, at its forward end (Fig. 3), with a gear 55 meshing with a rack 56 on a bar 57. This bar 57 has connected thereto a spring 58, which is normally under a tension tending to lift the bar 57 and thus rotate the shaft 51. This tendency, as has been explained, however, is restrained by the detent 49 until the latter is released by the striking of a numeral key.

The spring 58 together with the bar 57, the shaft 51 and the parts connected thereto, performs several functions at the actuation of a numeral key.

The first function which will be considered is the actuation of the striker or hammer 26, so that the pin corresponding to the numeral key which enables the spring 58 to act, will be set on the valuating wheel 29 to determine the extent of its rotation.

On the shaft 51 (Figs. 16 and 17), there is secured a member 59 having a hook or shoulder 60, which is arranged to engage a toe or flange 61 on a slide 62. This slide 62 is secured to the rod 33 forming a part of the cradle or hammer 26.

It will be seen that as the shaft 51 rocks to the right Figs. 16 and 17, it carries the slide 62 with it against the tension of a spring 63, so that the cradle is drawn forward carrying with it the interponent 25 which happens to be shifted by the depression of the associated numeral key to its setting position. Before the shaft 51 completes its cycle of movement, the hook or shoulder 60 will escape from the toe 61, as has just happened in Fig. 16, and then pass on to the position shown in Fig. 17, the toe 61 riding idly on the circular surface of member 59 until free and clear thereof. This permits the slide 62 and the cradle 26 to return to its normal position under the pull of the spring 63. If the spring 63 should not happen to restore the cradle to their normal position, the same would be positively restored by an extension 59ª on the member 59, engaging a flange 60ª on the slide 62, as the shaft 51 rocks farther to the right, as illustrated in Fig. 17.

The member 59 performs added functions, one of which consists in making or completing a circuit to an electric motor 64, which drives the whole machine. For this purpose, the member 59 is provided with an enlargement or cam 65, which engages a following roller 66 on a bell crank 67 and rocks the same about its pivot 68 against the tension of a spring 69, so as to pull on a link 70. The link 70 is connected to swing (Fig. 3) an arm 71 secured to a rock shaft 72. Also secured to the rock shaft 72 is an arm 73, which underlies a pin 74 on a lever or arm 75 loosely pivoted on the shaft 72. It will thus be seen that when the shaft 51 rotates a fraction of a revolution, the shaft 72 will be rocked to raise the arm 75.

There is provided on the arm 75, a bearing roller 76, which underlies a flexible spring contact 77, so as to raise the same into engagement with a similar spring contact 78. The contacts 77 and 78 are normally spaced apart and are each connected by electrical wires 79 to the electric motor 64 and the source of power. When the lever 75 moves upwardly, it makes or closes the connection between the contacts 77 and 78, so as to complete the circuit to the electric motor 64, when the source of power for the circuit, comprising the wires 79, is properly connected up to the source of power. The breaking of the connection between the contacts 77 and 78 is retarded by a dash pot 80, so that the arm 73 can move away from the arm 75 without the latter returning.

When the motor 64 is thus energized, its shaft 81 (Fig. 1) drives, through the intermediary of a pair of meshing bevel gears 82 and 83 a shaft 84. This latter shaft is provided with a bevel gear 85 meshing with a bevel gear 86, so as to drive a shaft 87. The gear 86, however, is loosely mounted on the shaft 87, but is arranged to be clutched thereto by a clutch comprising a clutch element 88 secured to the gear 86 and a clutch element 89, Fig. 14, splined on the shaft 87. The connection between these clutch elements and thus between the gear 86 and the shaft 87, is effected at the rocking of the shaft 51 when the latter is released by the depressal of a numeral key. This is accomplished by a spring 90 normally under a tension tending to draw a shifting arm 91 and the clutch element 89 to which this arm is connected, to a position such that the clutch element 89 will mesh with the clutch element 88.

Under normal conditions, when the shaft 51 is in its initial set position, the action of the spring 90 is prevented by an enlargement or cam 92 on the shaft 51, which abuts against a spacing dog 93 pivotally secured on the shifting arm 91 and held to its work by a spring 94. The enlargement or cam 92, however, has a deep drop at 95, so that when the cam rocks under the pull of the spring 58, the dog 93 will fall off the major surface of the cam 92, permitting the spring 90 to act to close the clutch and thus connect the gear 86 with the shaft 87. The rocking of the shaft 51 in returning to its initial position, as will be subsequently described, is permitted as the dog 93 is pivotally mounted, and the spring 94 will yield to permit it to rock, so that the enlarged portion 92 will come into opposition to the pivot point of the dog 93; the shifter 91, in the meanwhile, being cammed outwardly against the tension of the spring 90, thus breaking apart the clutch elements 89 and 88, by means of a camming finger 96 on the enlargement 92, which engages a cam surface 97 on the inner side of the shifting arm 91. It has thus been shown how the shaft 87 is connected in driven relation with the motor 64, and how the latter has been excited to action at the striking of a numeral key.

The shaft 87 is provided with a spur or pinion 98, which is arranged to rotate the valuating or index pin-wheel 29, but normally is arranged in register with the gap formed in this wheel by the previously set pin 28. When, however, a numeral key is struck to set up a new pin, the shaft 51 also enables the unsetting of the previously set pin, so that the mutilated gear formed of the pins 28, is once more completed by filling the gap at the point where the spur 98 overlaps the peripheral path of movement of the pins 28. The restoring of this set pin is accomplished by a restoring finger 155, having a pin-and-slot mounting 156, and normally held in full retired position by a spring 157. When the shaft 51 rocks, however, a camming roller 158 thereon engages the rear of the restoring finger 155 and momentarily forces it against the tension of the spring 157, to a position such that it restores the pin to fill the gap previously left by itself.

The spur 98 is free to slide with its shaft 87 against the tension of a spring 100 in case the restored pin should strike one of the teeth thereof, but will return immediately after having been justified by a beveled guide 99$^a$, to engage this pin and drive the same and all succeeding pins, until the gap in the wheel 29 is reached, which has been formed by the just set pin. Hence, the valuating or index pin-wheel 29 will be rotated an amount corresponding to the distance of the just set pin from the previously set pin, which amount depends on the numeral key actuated.

This measured rotation must be transferred to one or more computing heads, one of which is shown at 101 (Fig. 3). To do this, the valuating or index pin-wheel 29 is secured to a shaft 102, on which is also secured a bevel gear 103, meshing with a bevel gear 104, so as to drive a shaft 105 (Fig. 1). The shaft 105 in turn drives, through a pair of meshing bevel gears 106 and 107, a vertical shaft 108. This latter shaft is arranged to drive one or more master wheel shafts, of which only one, 109, happens to be shown. The shaft 108 is connected by gearing to the shaft 109, so that it may drive the latter in opposite directions for addition or subtraction, and so that it may rotate idly without driving the shaft 109 in case it is desired to have the corresponding computing head silent. For this purpose, there are provided on the shaft 108, pairs of oppositely-facing gears 110 and 111, one pair for each computing head. These gears are loosely mounted on the shaft 108, but arranged to be alternately connected thereto by means of a clutch 112 splined on the shaft 108 and shiftable to engage corresponding clutch faces in both the gears 110 and 111. Moreover, the clutch 112 can occupy an intermediate position in which it is not connected to either the gears 110 or 111. The gears 110 and 111 mesh with a bevel gear 113 on the master wheel shaft 109, and inasmuch as they face in opposite directions, are arranged to drive the gear 113 in opposite directions.

The master wheel shaft 109 is provided with one or more master wheels 114, one for each computing head, to be actuated by the same shaft. The master wheel is arranged to mesh individually with internal gears 115 provided on a series of computing wheels 116. The computing wheels 116 are also provided with external gears 117 meshing with gears 118 provided on accordant ones of dial wheels 119, the latter having numbers inscribed on their peripheries to be exhibited through a sight opening 120 in the casing 121 of the computing head 101.

For the purpose of effecting a carry-over operation between adjacent computing wheels and dial wheels, each computing wheel 116 is provided with a special tooth, which in every revolution thereof, is arranged to start in motion a carry-over group 122. This carry-over group includes a mutilated gear 123 having groups or toothed portions interrupted by spaces between them. When, however, the group is started in movement, one of the spaces between the toothed portions, which is normally located opposite an associated barrel gear 124, will be shifted to one side and a group of the teeth brought into mesh or into the sphere of operation of the teeth on the barrel gear 124, so that the group 122 will be rotated an amount sufficient to enable a pinion 125 of the group, meshing with the gear 117 of next higher denomination, to rotate the latter an amount corresponding to the distance between two adjacent numbers on the dial wheel 119. By this means a carry-over operation is effected between adjacent dial and computing wheels.

The computing wheels 116 and the dial wheels 119 are locked individually against rotation when not being positively driven by the master wheel 114. For this purpose, the group 122, which is positively connected at all times by its gear 125, with one of the computing wheels 116, is locked by an individual detent 126. This detent includes a locking arm 127, pivoted at 128 and normally held to its work by a spring 129. On the arm 127, there is provided a roller 130, which, when a computing wheel comes to rest showing the number on the dial wheel 119 accurately through the opening 120, will rest in a pocket 131 formed between the groups of teeth on the mutilated gear 123. There is one of these locking arms 127 for each train of dial wheel, computing wheel, and carry-over group, so that they are individually locked, and can be individually unlocked when the master wheel 114 is in register with any one train, permitting the driving of the same by the master wheel.

To drive the tens-carrying mechanism, the barrel gear 124 is secured on a shaft 132 (Fig. 3) and is provided with a pinion 133 meshing with an idler 134, which in turn is driven by a gear 135 on a shaft 136. This shaft 136 is also provided with a bevel gear 137, meshing with a pair of oppositely-facing bevel gears 138 and 139, loosely mounted on a shaft 140. The bevel gears 138 and 139 are arranged to be alternatively connected in driven relation with the shaft 140 by a clutch 141 splined on the shaft 140 and acting similarly to the clutch 112. That is to say, this clutch 140 has three positions corresponding with the connecting of the gear 138 in driven relation with the shaft 140; the gear 139 in driven relation with the shaft 140, and an idle intermediate position in which neither the gear 138 nor the gear 139 is connected in driven relation with the shaft 140. This enables the rotation of the barrel gear 124 in one direction or the other to correspond with rotation of the master wheel shaft 109 for addition or subtraction. It also enables the bevel gear 124 to remain silent when the master wheel shaft 109 is silent. The shaft 140 is driven from the motor 64 by being provided with a bevel gear 142 (Fig. 1), which meshes with a bevel gear 143 on a shaft 144, bearing at its other end a bevel gear 145 meshing with a bevel gear 146 on the shaft 84, which is driven from the motor 64 as explained above.

The clutches 112 and 141 are arranged to be shifted concomitantly by a composite lever 147, which includes a shifting lever 148 having a pin to engage a groove in the clutch 112, and a supplementary lever 149 pivotally mounted on the lever 148 and having a pin to engage in the groove in the clutch 141. The lever 149 has a limited relative movement with respect to the lever 148, which is taken up by a spring 150. This allows the clutch teeth of one clutch to settle in case the teeth of the other clutch have not been brought into exact register with the clutch teeth on the opposed gear faces. The composite shifting lever 147 is locked in any one of its three adjusted positions, corresponding to addition, subtraction, and neutral, by a spring detent 151 pivotally mounted on a stud shaft 152, and having a toe to engage between or on opposite sides of a pair of teeth 153 on a locking arm 154 carried by the lever 148.

As has been stated above, one of the elements of each coöperating computing head and master wheel travels while the other is stationary, so that the master wheel 114 will come successively into driving relation with each individual computing wheel. In order to effect this traveling movement, the computing head, which is shown movable in this case, is adjustably mounted by means of a link 159 on a sub-carriage 160, which is guided for traveling movement on ways 161 by rollers 162. The sub-carriage 160 is detachably and adjustably connected by a latch 163 to the typewriter carriage 7.

Inasmuch as the movement of the typewriter carriage 7, during a computing operation, would disaline the master wheel with respect to the computing wheel with which it is in coöperation, it is essential that the carriage 7 be locked against a traveling movement at such time. To accomplish this, the bar 57, which is drawn up by the spring 58 when the shaft 51 is permitted to rock at the striking of a numeral key, is provided with a rack 164 (Figs. 5 and 6). This rack meshes with a segment 165 to rock a lever 166, which is provided with a second segment 167 meshing with a fragmentary pinion 168 secured to a shaft 169. The shaft 169, when rocked in the direction of the arrow shown in Fig. 6, will swing a lever 170 to draw on a link 171, and thus swing an arm 172, so as to rock a shaft 173. The rock shaft 173 bears an arm 174 carrying a roller 175 underlying an arm 176 secured to a shaft 177. The shaft 177 is a rock shaft and is provided with a pair of arms 178, which form a swinging frame for the universal frame 15.

It will thus be seen that if the type bar 5, by its heel 17, has not already swung the universal frame 15 to bring the fixed dog 14 into engagement with the escapement wheel 12, the auxiliary source of power, comprising the spring 58, will accomplish this, thereby locking the carriage 7 against movement. The fixed dog 14 will be maintained in engagement with the escapement wheel 12 while a computing action is taking place and until the bar 57 has been restored to its depressed position against the tension of the spring 58. This latter occurs only when the number corresponding to the value of the numeral key actuated has been completely run up into the computing head.

In addition to locking the carriage, the computing head 101 itself is locked against movement. For this purpose, the auxiliary power mechanism is made to perform two functions at once. That is to say, the same part which locks the computing head against movement, will release the computing train to be driven by the master wheel from the locking roller 130. Therefore, the bar 57 is provided with an upwardly-projecting extension 179, which, when the spring 58 acts to raise the bar 57, will pull on a link 180 (Fig. 3) to swing upwardly an arm 181 and thus rock a shaft 182 extending across the front of the machine. The rock shaft 182 is provided at a point coincident with the plane of the master wheel 114, with an arm 183 bearing a selecting pin 184. The selecting pin 184 overlies the particular locking arm 127 bearing the detent roller 130 which locks against movement the particular train with which the master wheel 114 happens to be in register. All of the locking arms 127 have a V-shaped cross-section, as will be seen by reference to Fig. 3, so that when one is depressed against the tension of the spring 129, by the selecting pin 184, it will engage a V-groove 185 in the fixed portion of the frame, thereby not only releasing the computing train in register with the master wheel but also locking the computing head 101 against traveling movement. The locking arm or lever 127 will be held in action just so long as the bar 57 is in its raised position, which is a period of time coincident with the running up of the number corresponding to the value of the numeral key actuated, into the computing head 101 by the master wheel 114.

The master wheel 114 when not actually being driven from the motor 64, to run up a number in the computing wheel with which it happens to be in register, is locked against accidental movement. For this purpose, the master wheel shaft 109 is provided with a notched detent wheel 186, which is normally engaged by the toe 187 of a complex detent 188. This detent is normally held to its work by a pin 189 on the extension 179 of the bar 57, which engages a cam finger 190 of the detent 188. The pin 189 happens to be the pin which connects the link 180 to the extension 179, but might be any other pin.

It will be seen, when the bar 57 is raised with its extension 179 at the incitation of a computing action, that the detent 188 will be free to swing under its weight to a releasing position, permitting the rotation of the master wheel shaft 109. If, however, any particular computing head 101 happens to be in its neutral condition, that is, with the composite lever 147 in a mid-position corresponding to neither adding nor subtracting, then the detent 188 should be held in its locking position even though the bar 57 and the extension 179 are raised for a computing action, which may be taking place in other computing heads. For thus holding the detent of the neutral computing head in locking position, the locking arm 154 is provided with a crook or gooseneck 191 (Fig. 1), which engages an offset 192 on the detent 188 and prevents the disengaging swinging of the detent 188 even when the pin 189 is moved upwardly to free the detent 188.

We will consider at this point how the auxiliary motor or spring 58 is retensioned and how the bar 57 and the various parts operated thereby, are returned to their normal set positions such as they would occupy previous to the striking of a numeral key to effect a computation. Referring to Figs. 1 and 3, it will be seen that the extension 179 of the bar 57 carries a roller 193, which is engaged by a lever 194, so that the latter may depress the bar 57, retensioning the spring 58 when said lever 194 is rocked against the tension of its spring 195. To rock the lever 194, it is provided with an arm 196 bearing a following roller 197, which engages a cam 198 loosely mounted on the shaft 144. The cam 198 may, however, be connected to the shaft 144 by a clutch 199, which includes a clutch element secured to the cam 198 and a clutch element secured to a sleeve 200 splined on the shaft 144. These clutch elements, however, are normally held out of engagement with each other by a spring 201. To shift the sleeve 200 to a position to bring about a coöperation of the clutch elements, so that the cam 198 may be rotated from the shaft 144 to rock the lever 194, there is provided a clutch shifter 202 (Figs. 13 and 15). The shifter 202 has pivotally connected thereto a connecting latch 203, held in a definite relation with respect to the shifter 202, by a spring 204. The latch 203 has a hook 205, which normally occupies the position shown in Fig. 1, with respect to an offset or nose 206 on a rocker 207. This rocker 207, however, may be shifted from the Figs. 1 and 13 position to the Fig. 15 position, by the pins 28 of the valuating wheel 29, during the latter's rotation, camming aside a hook finger 208, which normally engages between two of the pins 28, as shown in Fig. 13. When the rocker 207 is swung to this position, the nose 206 engages beyond the hook of the latch 203, so as to be ready to shift the same and draw with it the shifter 202.

This shifting action is accomplished by the last set pin 28 coming into engagement, as illustrated in Fig. 15, with an arm 209 on the rocker 207, just as this last set pin approaches its home position corresponding to the registering of the gap in the valuating wheel 29 with the driving spur 98. That is to say, just as the valuating wheel comes to rest, it will swing the rocker 207, so that the latter will draw on the latch 203, moving the shifter 202 to bring about a clutching of the cam 198 in driven relation with the shaft 144. The cam will then be rotated one complete revolution with the shaft 144, so as to rock the bell crank lever 194, thereby depressing the extension 179 and the bar 57, and retensioning the spring 58. This also returns the shaft 51 and all parts connected thereto to their normal positions, in which positions they are locked by the detent 49 until subsequently released by the striking of another numeral key.

As the cam 198 approaches the end of its revolution with the shaft 144, a second cam 210 connected to the cam 198 by a sleeve 211, will engage the latch 203 to press it against the tension of the spring 204, thereby disengaging it from the nose 206 on the rocker 207, permitting the spring 201 to act to unclutch the cam 198 from the shaft 144.

It is not desirable to have the computing mechanism effective to carry on a computing action during the entire travel of the typewriter carriage 7. In fact, it is only desirable to have the same connected during the writing of numbers in a computing zone or column. To accomplish this selection of the active and inactive periods of the computing mechanism, there is adjustably mounted on a rack 212, carried by the carriage 7, one or more tappets 213 (Fig. 7), one for each computing zone or column. Each tappet 213 is adapted to cam aside a zone-controller 214 when a computing zone is opposite the printing point of the typewriter.

The zone-controller 214 may include a pair of plates 215 and 216 adjustable relatively to each other to vary the period of engagement of a tappet 213 therewith, and thus vary the magnitude of the computing zone. The zone controller 214 may also include a lever 217 mounted to rock on a pivot 218 and having an arm 219 connected to draw on a link 220 and thus swing up an arm 221 to rock a shaft 222. The shaft 222 is provided with a second arm 223 arranged to pull down on a link 224, so as to depress one end of a lever 225 against the tension of a spring 226. The lever 225 is provided with a toe 227 arranged to engage a pin 228 on a segment 229. The segment 229 meshes with a corresponding segment 230 pivoted on a shaft 231. The segment 229 is connected to a lever 232 mounted on the same pivot 233 as the lever 225 and the segment 229, by means of a spring 234. The segments 229 and 230 may be rotated by a finger-piece 235 from the position shown in Fig. 7 to the position shown in Fig. 8, and back again, the movements of the segments being limited in both directions by enlarged teeth on one or both of them at the ends thereof.

The spring 234 in either position tends to draw the lower part of the lever 232 and the segment 229 toward each other, so as to rock the lever 232. In the position shown in Fig. 7, this is prevented by the spring 226, which is stronger and causes a pin 236 to hold up an arm 237 secured to the lever 232 and forming a part thereof. Another arm, 238, of the lever 232 is bifurcated at its upper end to engage the opposite sides of the pivot 231 and limit the back-and-forth swing of the lever 232.

When the parts are in the position shown in Fig. 7, the actuation of the zone controller 214 by a tappet 213, depresses the lever 225 against the tension of the spring 226, permitting the spring 234 to act, so that the lower end of the lever 232 will be drawn to the left, thereby pulling on a link 239. This link is connected to rock a lever 240, which in turn pushes on a link 241 connected to rock a silencer or controller 242. This controller is in the form of a bell crank provided with an offset 243 having an opening therein, through which the tripper 45 extends. It will thus be evident with the parts as illustrated in Fig. 7, that when the tappet 213 engages the zone controller 214, it enables the silencer or controller 242 to lower the tripper 45 to such a position (full lines, Fig. 4) that the serrations or teeth thereof will be capable of engaging the toe 48 on the detent 49, so that when the tripper is actuated it will be capable of disengaging the detent 49 from the toothed ratchet wheel 50.

Under these conditions, with the parts arranged as in Fig. 7, when not in a computing zone, that is, when a tappet 213 is not in engagement with the zone controller 214, then the tripper 45 will be held in its raised position, and even though it is vibrated, it will clear the toe 48 without tripping the detent 49, hence the computing mechanism will be silent.

If it is desired to throw the computing mechanism out of action, even when it comes to a computing zone or column, the segments may be manipulated to the position shown in Fig. 8, when the spring 234, although readjusted, will still tend to draw the lower arm of the lever 232 toward the segment 229 but in the opposite direction, so that the silencer or controller 242 will be in its raised position holding the tripper 45 up in its ineffective position.

If the arm 225 should be depressed at this time under the action of the zone controller 217, it would merely act idly against the spring 226 and there would be no tendency for the lever 232 to rock to such a position as to lower the tripper 45, as the spring 234 now acts in the opposite direction. The pin 228, which normally holds the segment against backward rotation, and, in fact, gives it a counter-rotation to aid the movement of the lever 232, will now be entirely clear of the lever 225, so that the lever 225 will have no tendency to swing the lever 232.

We now come to the safeguarding mechanism for preventing the actuation of the computing mechanism by the numeral keys at inopportune times. This is accomplished by locking the numeral keys themselves: first, when one numeral key is depressed; second, when writing in a denominational column corresponding to a comma between hundreds and thousands, etc., and to the decimal point; third, after the depressal of a numeral key and its return and before the completion of a computation; and, fourth, when the computing mechanism has not been driven after the actuation of a numeral key, as when the electric motor is not properly connected up with its source of current.

Considering the first of these and referring to Figs. 3 and 16, it will be seen that each of the levers 21, of which, as has been stated above, there is one for every numeral key, is provided with a locking blade 244. These locking blades 244 are arranged to vibrate at the actuation of the associated numeral keys through radial slots 245 in a guiding spider 246. Each of the blades, therefore, has a path of movement extending across the center of the spider 246, so that more than one blade 244 and thus more than one numeral key cannot be actuated at the same time as they interfere one with the action of all the others.

For the other safeguards, use is made of these same locking blades 244 whose action is interfered with and thus the actuation of their corresponding numeral keys interfered with held by a supplementary locking element 247 (Figs. 9 to 11). The locking element 247 is in the form of a lever having an obstructing head 248, normally held in a receded position by a spring 249, but capable of being advanced to a position common to the paths of movement of all the locking blades 244, so as to interfere with the movement of any of the locking blades, and thus interfere with the actuation of any of the numeral keys.

To use the supplementary locking element 247, in order to prevent the writing of numbers when in comma and decimal point columns, there is provided on the zone controller 214, a block 253 (Fig. 7) carrying a plurality of rollers 254 spaced three letter-space intervals from each other and projecting slightly in advance of the bearing edge formed by the plates 215 and 216. These rollers 254 are arranged to come into engagement with the tappet 213 so as to give the zone controller 214 an excessive throw, which, through the connecting linkages, will give an excessive forward movement to the link 241, which actuates the silencer or controller 242. The link 241 has secured thereon a collar 255, Fig. 11, which engages one arm of the supplementary locking lever 247, so as to swing this lever and bring the obstructing head 248 to a point common to all of the paths of movement of the locking blades 244, preventing the movement of any of these blades and thus preventing the actuation of any of the numeral keys. The collar 255 is so located that it only comes into action on an excessive forward movement of the link 241, which movement will only take place when one of the rollers 254 causes an excessive rocking of the zone controller 217, This supplementary locking element 247 is also actuated against the tension of the spring 249 when a computing action is started by a numeral key. To do this, the rock shaft 72 (Fig. 3), which is operated from the shaft 51 at the striking of the numeral key to complete the circuit to the electric motor by means of the contacts 77 and 78, is also provided with an arm 250, which will be swung to thrust before it a plunger 251. The plunger 251 passes through an aperture in the supplementary locking lever 247 and is indirectly connected to actuate this lever by means of a spring 252 interposed between them. The spring 252, however, does not rock the lever 247 immediately, because the same numeral key, which moves the plunger 251 to tension the spring 252, also moves one of the locking blades 244 across the common center, thus preventing the intrusion of the locking head 248 on the supplementary locking lever 247. As soon, however, as the numeral key returns to its raised position, if the computing operation started by this numeral key is still in action so that the shaft 72 has not been rocked back to its normal position, then the spring 252 will act to cause the locking head 248 to take the place of the receding locking blade 244, preventing the actuation of the same or any other numeral key until the computing action has been completed. When the computing action has been completed, the shaft 51 will be returned to its normal position with the retensioning of the spring 58 and the depressal of the bar 57, so that the shaft 72 and the arm 250 carried thereby will be returned to their normal position relieving the pressure on the spring 252, permitting the spring 249 to withdraw the supplementary interfering element 247 from its locking position.

If the motor should not have driven the computing mechanism, as in case the circuit had not been connected up to the source of electric power, then the bar 57 and the shaft 51 would not be returned to their normal positions, as the retensioning and resetting mechanism depends for its action on being driven from the motor 64. Under these conditions, the spring 252 would still remain under pressure maintaining the locking head 248 on the supplementary locking element 247 in its interfering position, thereby preventing the actuation of any numeral key, notifying the operative that the machine is not in proper condition to do its work.

If the machine should happen to be locked against actuation as in the case above-mentioned, when the motor does not drive the computing mechanism after an actuation of a numeral key, or should go wrong for any other reason, it can be reset manually by a restorer 256 (Figs. 3, 5 and 18). This restorer consists of a lever 257 having a finger-piece 258, by means of which it may be actuated against the tension of a spring 259. The lever 257 also is provided with a pin 260 underlying one arm of the lever 166, so as to rock the same about its pivot, and thus, through the intermediary of the segment 165, depress the bar 57 and retension the spring 58, until all the parts connected to this bar and to the shaft 51 are restored to their normal positions.

In addition to restoring the various locks and safeguards connected to the shaft 51 and the bar 57, this restorer 256 is capable of restoring any of the pins 28 which have been set, with the exception of the pin which forms a gap at the point of overlapping of the periphery formed by the ring of pins 28 and the spur wheel 98. For this purpose, there is provided a restoring ring 261, which faces all of the pins 28 at their back ends, with the exception of the pin forming the gap at the point of mesh of the spur wheel 98, the ring being cut away to avoid this pin and to avoid the end of the arm 209. The restoring ring 261 is connected to a shifting arm 262, which is pivoted as 263. This arm is provided with a following roller 264 normally engaged by a cam 265 on the shaft 51, which holds the restoring ring 261 in a position contiguous to the pins 28. When, however, the shaft 51 is rotated at the releasing of the detent 49, a spring 266 will withdraw the restoring ring 261, as the cam 265 recedes, so as to permit the setting of the pin corresponding to the numeral key actuated, in the usual way by the cradle or hammer 26.

It will thus be seen that when the hand-operable restorer 256 is actuated, it not only resets the shaft 51, the bar 57, and all parts connected thereto, to their normal set positions ready to start a computation, but it also causes the cam 265 to slap the restoring ring 261 against the ring of pins 28, thereby returning any which may have been set at the previous striking of a numeral key, without the running up of a computation, to their normal unset position.

In case the tripper 45 is in its actuated position holding the detent 49 clear of the toothed ratchet wheel 50, the restorer 256 will disengage the tripper 45 from the toe 48, permitting the return of the detent 49. To do this, there is provided on a shaft 267, a deflector 268, which is normally spring held in the position shown in Fig. 1, but when the restorer 256 is raised, a cam 269 on the restorer engages a follower 270 on an offset of the deflector 268, so as to swing the latter about the shaft 267, causing a cam surface 272 thereon to raise the tripper 45, which it underlies. The shaft 267 extends through a slot in the restorer 256 and acts as a guide therefor.

In order to prevent the restorer 256 being actuated a part-stroke without completing its operation, there is provided a full-stroke mechanism including a double-acting detent 273, which is held by a spring 274 in such a position that it will engage a ratchet 275 on the restorer 256 and prevent a partial movement thereof and return in either direction. That is to say, the restorer must be moved its full stroke up before it can be moved down, and after having been moved its full stroke up, must be moved its full limit down before it can be moved up.

Considering briefly the operation of the device, the numeral keys 2 can be freely actuated until a computing zone or column is reached, when one of the tappets 213 will come into engagement with the zone controller 214. This zone controller, through the connecting linkages, pulls down on the lever 225 to permit the controller 214 to rock downwardly enabling the tripper 45 to come into contact with the toe 48 of the detent 49. Thus, when in a computing zone, if a numeral key should be actuated, this tripper 45 may be operated to release the detent.

In striking a numeral key, an interponent 25, corresponding to the particular numeral key actuated, will be shifted by its lever 21 to the position shown in Fig. 16, so that the tail end thereof is in the path of the head 27 of the hammer or striker 26. In setting the interponents to this position, the disk 41 is slid rearwardly against the tension of its spring, so that it rocks the lever 43 and thus thrusts the tripper 45 before it, causing the saw teeth thereof to engage the toe 48 and release the detent 49. The release of this detent permits the spring 58 to act, raising the bar 57 and rotating the shaft 51. The bar 57, through its connections, locks the carriage 7 against movement, by holding the fixed dog 14 in mesh with the ratchet wheel 12. The bar 57 also through its connections, rocks downwardly the selecting pin 184, so that it will move a locking lever 127 to such a position that its detent roller 130 will unlock the particular train of computing and dial wheels which happens to be in register with the master wheel. At the same time, this locking lever 127 engages the fixed locking groove 185, so as to prevent any traveling movement of the computing head 101.

If the computing wheel should happen to be slightly out of register with the master wheel, the beveled form of the lever 127 engaging the V-groove 185, will bring the computing wheel into exact register with the master wheel, or else prevent the motor from driving the master wheel, in case registration is impossible as hereinafter explained.

The rotation of the shaft 51, under the drive of the spring 58, first unsets the pin at the gap in the valuating or index wheel 29; then, through the connection to the hammer or cradle 26, drives the selected interponent forward, setting the selected pin apposite to it, while the restoring ring 261 recedes before the oncoming pin under the tension of the shifting arm spring 266. The clutch 88, 89 is connected up so as to connect the motor in driving relation with the shaft 87, on which the spur wheel 98 is secured.

In the meantime, the cradle or hammer 26 will have returned to its normal position after having set the pin, so as to withdraw the interponent from interference with the pins 28 of the valuating wheel 29.

The circuit to the motor 64 will also have been completed by bringing the contacts 77 and 78 into engagement with each other. The motor will then drive through the connecting mechanism, the master wheel 114, which, in the meantime, has been released by the detent 188 falling away as the pin 189 moved up out of locking engagement with the cam finger 190. The master wheel will then be rotated an amount corresponding to the particular numeral key actuated. While this rotation is going on, the arm 208 of the rocker 207 will be forced aside by the pins 28 as the wheel 29 rotates, so that the nose 206 thereon will engage the hook 205 of the latch 203.

As the computation approaches completion, the valuating wheel 29 will approach a position such that the just set pin will come to a point in register with the spur wheel 98, when the spur wheel will be opposite a gap in the valuating wheel 29, and thus incapable of further driving the same. Before this point is reached, however, the just set pin will come into engagement with the arm 209 of the rocker 207, swinging it to the left (Fig. 15), so as to move the shifter 202 against the tension of the spring 201, closing the clutch 199, thereby connecting the sleeve 211 in driven relation with the shaft 144, so that the cams 198 and 210 will be rotated therewith.

The cam 198 will rock the bell crank 194, so as to depress the extension 179 and the bar 57, retensioning the spring 58 and returning the shaft 51 and the parts connected thereto to their normal positions. This, then will unlock the carriage, unlock the computing heads 101, and restore the shaft 72 and the parts connected thereto to their normal positions, so that the numeral keys will be unlocked. The computing mechanism is then in a condition to have another numeral key struck, so as to run up a second computation.

In case the operative is faster in striking the successive numeral keys than the machine can compute, the supplementary lock 247 will come into play, taking the place of the receding locking blade 244, so as to prevent the subsequent actuation of a numeral key, until the computing mechanism has returned to its passive condition showing that the computation has been completed. This same lock comes into play through the connection to the zone controller 214, when the typewriter is positioned so that the denominational columns at the printing point correspond to the writing of the commas between hundreds and thousands, thousands and millions, etc., and the decimal point, so as to prevent the writing and computing of numerals at these points.

In case the computing mechanism should be disarranged and not act properly, as when the motor is not connected up to the source of power, the striking of a numeral key, while it will set a pin, will not restore the computing mechanism to its normal condition. This could be done by actuating the restorer 256, which will retension the spring 58, and return the bar 57 and the shaft 51 to their normal conditions.

It is to be understood that in case the typewriter carriage should not stop exactly at a letter space, or when for any other reason the computing wheels of the computing head 101 should be out of exact register with the master wheel 114, the machine would be locked against action. That is to say, whatever locking lever 127 happened to be in register with the selecting pin 184, it would not exactly settle in the V-groove 185, so that it would prevent the complete upward movement of the bar 57, and thus would prevent the complete rotation of the shaft 51. Hence, the finger 93 will not quite reach the drop 95 in the cam 92, so that the spring 90 would be prevented from acting, whereby the clutch element 89 would not be drawn into action with the clutch element 88.

Under these circumstances, the computing mechanism would not be driven by the motor 64, even though it itself should be excited to action. This would prevent the master wheel from improper action until the computing wheels of the computing head 101 should be brought into proper registration therewith. Of course, if the bar 57 is prevented from moving upward its fullest amount, it would not completely release the lock 188, so that the master wheel shaft 109 and the master wheel 114 would still be locked against rotation.

Variations may be resorted to within the scope of the invention, and portions of the improvements may be used without others.

Having thus described my invention, I claim:

1. The combination with a series of index pins, of a series of interponents for setting said pins, and a cradle for said interponents, said cradle having a beveled ring to engage in notches provided in each of said interponents, so that said interponents may be rocked about said ring as a fulcrum.

2. The combination with a series of index pins, of a series of interponents for setting said pins, and a cradle for said interponents, said interponents each having an offset spaced apart from the body thereof to form a space therebetween, said cradle having a beveled ring to engage in the spaces provided in said interponents, so that said interponents may rock about said ring as a fulcrum.

3. The combination with a series of settable pins, of a series of interponents for setting said pins, levers for shifting said interponents, and a hub forming a pivotal support for said levers, each of said interponents having an extension to form a right-angle shoulder to engage said hub and lock said interponents against bodily movement.

4. The combination with a series of settable pins, of a series of interponents for setting said pins, a series of levers for shifting said interponents, a hub forming a pivotal support for said levers, and a cradle for actuating said interponents after having been shifted by said levers, each of said interponents having an extension to form a right-angle shoulder engaging said hub to prevent the manipulation of said interponents by said cradle until shifted by their levers to a position in which said shoulders are disengaged from said hub.

5. The combination with a series of settable pins, of a series of interponents for setting said pins, a hammer for actuating said interponents, a slide connected to actuate said hammer, a shaft, a member on said shaft having a shoulder to engage said slide to draw on the same, said shoulder being arranged to escape from said slide after a predetermined movement of said shaft, and means for returning said hammer to its normal position.

6. The combination with a series of settable pins, of interponents for setting said pins, numeral keys for shifting said interponents to an actuable position, and means actuating said interponents to set pins and returning the same immediately to their normal position, clear of said pins.

7. The combination with a series of settable pins, of interponents for setting said pins, a striker for shifting a selected one of said interponents to set a selected one of said pins, and means for immediately returning said striker and the selected interponent to a normal position clear of said pins.

8. The combination with a series of settable pins, of a series of interponents for setting said pins, means for actuating a selected interponent to set a selected pin, means for actuating said first-mentioned means in a direction to set a pin, and a spring for returning said first-mentioned means immediately after actuation.

9. The combination with a series of settable pins, of a series of interponents for setting said pins, a striker for actuating a selected one of said interponents to set a selected one of said pins, means for momentarily actuating said striker and tripping therefrom, and a spring for returning said striker and said interponent to normal position clear of said pins immediately after actuation.

10. The combination with a series of settable pins, of a series of interponents for setting said pins, a striker for actuating a selected one of said interponents to set a selected one of said pins, means for momentarily actuating said striker and tripping therefrom, and a spring for returning said striker and said interponent to normal position clear of said pins immediately after actuation, said means also acting to positively return said striker and said interponent to normal position in case of the failure of said spring to act.

11. The combination with a valuating member having a series of pins settable to determine the extent of a computation, of means for driving said valuating member, a series of interponents for setting said pins, a striker for actuating a selected one of said interponents to set a selected one of said pins, and means for actuating said striker to set a pin and return said striker and the selected interponent to its normal position clear of said pins prior to a computing movement of said valuating member.

12. The combination with a valuating member having a series of pins settable to determine the extent of a computing movement thereof, of a series of interponents for setting said pins, a striker for actuating a selected interponent to set a selected pin to start a computation corresponding to the value of the selected pin, means for driving said member an amount determined by the selected pin, and means for actuating said striker to set the pin and returning said striker before the driving action of said valuating member by said means commences, so that said interponents will be always clear of said pins when the latter are in motion.

13. The combination with a valuating member having a series of pins settable to determine the extent of a computation, of a series of interponents for setting said pins, a striker for actuating a selected interponent to set a selected pin, an auxiliary source of power connectible momentarily to said striker to actuate the same, and means for tripping said striker from said auxiliary source of power prior to the running up of a computation by said valuating member.

14. The combination with a valuating member having a series of pins settable to determine the extent of a computation, of a series of interponents for setting said pins, a striker for actuating a selected interponent to set a selected pin, an auxiliary source of power for actuating said striker, means for driving said valuating member an extent determined by the set pin, and means for disconnecting said striker from said auxiliary source of power prior to the driving of said valuating member by said first-mentioned means.

15. The combination with a valuating member having a series of pins settable to determine the extent of a computation, of a series of interponents for setting said pins, a striker for actuating a selected interponent to set a selected pin, an auxiliary source of power for actuating said striker, means for driving said valuating member an extent determined by the set pin, and means for disconnecting said striker from said auxiliary source of power and returning it with said interponent to a position clear of said pins prior to the driving of said valuating member by said first-mentioned means.

16. The combination with a valuating member having a series of pins settable thereon to determine the extent of a computing movement thereof, of a series of interponents for setting said pins, a striker for actuating a selected interponent to set a selected pin, driving means for moving said valuating member an amount determined by the pin selected, and means for positively moving said striker and the selected interponent to a position in which all the interponents will be clear of said pins, enabling a free movement of said valuating member.

17. The combination with a valuating member having a series of pins settable thereon to determine the extent of a computing movement thereof, of a series of interponents for setting said pins, a striker for actuating a selected interponent to set a selected pin, a drivable shaft, and means for intermittently connecting said striker in driven relation with said shaft.

18. The combination with a valuating member having a series of pins settable thereon to determine the extent of a computing movement thereof, of a series of interponents for setting said pins, a striker for actuating a selected interponent to set a selected pin, a drivable shaft, means for intermittently connecting said striker in driven relation with said shaft, and means for disconnecting said striker from said shaft and returning it and its selected interponent to normal position clear of said pin.

19. The combination with a valuating member having a series of pins settable to determine the extent of a computing movement thereof, of a series of interponents for setting said pins, a striker for actuating a selected interponent to set a selected pin, a drivable shaft, means set in motion at the actuation of said shaft to drive said valuating member an extent determined by the pin set, and means for intermittently connecting said striker in driven relation with said shaft and disconnecting it therefrom prior to an actuation of said valuating member by said driving means.

20. The combination with a series of pins settable to determine the extent of a computation, of a series of interponents for setting said pins, a striker for actuating a selected interponent to set a selected pin, a slide connected to said striker, a rotatable shaft, and a member having a shoulder to engage and actuate said slide and disengage itself from said slide at a single movement of said shaft.

21. The combination with a series of pins settable to determine the extent of a computation, of a series of interponents for setting said pins, a striker for actuating a selected interponent to set a selected pin, a slide connected to said striker, a rotatable shaft, a member having a shoulder to engage and actuate said slide and disengage itself from said slide at a single movement of said shaft, and a spring for returning said slide and said striker to their normal positions.

22. The combination with a series of pins settable to determine the extent of a computation, of a series of interponents for setting said pins, a striker for actuating a selected interponent to set a selected pin, a shaft, means for actuating said shaft, a slide connected to said striker to actuate the same, an extension on said slide, a member on said shaft having a shoulder to engage said extension and trip therefrom during a single movement, and a finger on said member engaging said slide to positively return said slide and said striker to their normal positions before said shaft completes its movement.

23. The combination with a series of pins settable to determine the extent of a computation, of a series of interponents for setting said pins, a striker for actuating a selected interponent to set a selected pin, controlling means for starting a computation, and means governed in its action from said controlling means for effecting a complete reciprocation of said striker, so as to set a pin and return the selected interponent clear of all of said pins before said controlling means entirely completes its action.

24. The combination with a valuating member having a series of pins settable to determine the extent of a computation, of a motor for driving said member, a normally open clutch between said motor and said member, a series of interponents for setting said pins, a striker for actuating a selected interponent to set a selected pin, controlling means for closing said clutch, and actuating means for effecting a complete reciprocation of said striker to set the selected pin and return the selected interponent to a position clear of all of said pins, said actuating means being controlled from said controlling means so as to complete its action prior to the closing of said clutch.

25. The combination with a valuating member having a series of pins settable to determine the extent of a computation and a source of power for driving said valuating member, of controlling means for governing the drive of said valuating member by said source of power, a series of interponents for setting said pins to determine the extents of computation, a striker for actuating a selected interponent to set a selected pin, and actuating means for said striker controlled from said controlling means to effect a complete reciprocation of said striker and selected interponent prior to the driving of said valuating member by said source of power, so as to set a pin and remove the selected interponent to a position clear of said pin before said valuating member and the pins carried thereby start in motion.

26. The combination with a series of computing wheels, of a master wheel for driving said computing wheels at times free from engagement therewith, a lock for said master wheel, a normally interrupted train of gearing for driving said master wheel, said lock being normally in action to prevent a rotation of said master wheel while said train of gearing is interrupted and while disengaged from said computing wheels, and means for concomitantly completing said train of gearing and releasing said lock so that the master wheel can be driven when said gearing is in condition to drive it.

27. The combination with a series of computing wheels, of a master wheel for driving said computing wheels, a master wheel shaft for said master wheel, a lock for said master wheel at said shaft, a motor for driving said master wheel shaft, a train of gearing connecting said motor with said master wheel shaft, a circuit for said motor, said circuit being normally open and said train of gearing being normally interrupted, said lock being normally effective while said train of gearing is interrupted and while said circuit is open, and a common means for concomitantly releasing said lock, completing said train of gearing and closing said circuit.

28. The combination with a computing mechanism, including a master wheel, of a lock for said master wheel, releasing means for said lock, and silencing means for said computing mechanism connected to maintain said lock in action irrespective of the action of said releasing means.

29. The combination with a series of computing wheels, of a master wheel for driving said computing wheels, a lock for said master wheel, driving means for actuating said master wheel, said lock being normally effective while said driving means is silent, automatic means for concomitantly causing an actuation of said driving means and the release of said lock, and manual means for silencing said driving means and preventing a release of said lock independently of the action of said automatic means.

30. The combination with a series of computing wheels, of a master wheel for driving said computing wheels, a lock for said master wheel, a train of gearing for driving said master wheel, said train of gearing being interruptable at a plurality of points, automatic means controlling the connection of said train of gearing at one of said points, manual means for controlling the connection of said train of gearing at another of said points, and means for maintaining said lock in action when said train of gearing is interrupted at any of said points.

31. The combination with a series of computing wheels, of a master wheel for driving said computing wheels, a lock for said master wheel, a train of gearing connected to drive said master wheel and being interruptable at a plurality of points so as to be incapable of driving said master wheel when interrupted at any of said points, and means for maintaining said lock in action when said train of gearing is interrupted at any of said points.

32. The combination with a series of computing wheels, of a master wheel for driving said computing wheels, a lock for said master wheel, shifting means for controlling the drive and direction of drive of said master wheel, and means preventing the release of said lock controlled from said shifting means.

33. The combination with a series of computing wheels, of a master wheel for driving said computing wheels, a lock individual to each of said computing wheels, a lock for said master wheel, power means for moving both said locks to ineffective positions, and means for releasing the power means to enable the lock for said master wheel and the lock for the particular computing wheel with which the master wheel happens to be in register to be moved concomitantly.

34. The combination with a series of computing wheels, of a master wheel for rotating said computing wheels, a lock for said master wheel, said lock having a cam arm thereon, a bar having a pin to engage said cam arm to render said lock effective, and a spring for actuating said bar.

35. The combination with a series of computing wheels, of a master wheel for rotating said computing wheels, a lock for said master wheel, said lock having a cam arm thereon, a bar having a pin to engage said cam arm to render said lock effective, a spring for actuating said bar, computing mechanism for controlling the extent of rotation of said master wheel, numeral keys for controlling the action of said computing mechanism, and connections enabling said numeral keys to control the movement of said bar under the pull of said spring.

36. The combination with a series of computing wheels, of a master wheel for rotating said computing wheels, a lock for said master wheel, computing mechanism for controlling the extent of rotation of said master wheel, connections controlling the effectiveness of said lock from said computing mechanism, means for determining the rotation and direction of rotation of said master wheel, and connections for controlling said lock from said last-mentioned means.

37. The combination with a series of computing wheels, of a master wheel for rotating said computing wheels, a lock for said master wheel, means for normally holding said lock in action, releasable to enable a computing rotation of said master wheel, and additional means for holding said lock in action when it is desired to completely silence said master wheel to prevent a computing action.

38. The combination with a valuating member having a series of pins thereon settable to determine the extent of a computing action of said member, of a restoring element for unsetting said pins, said restoring element having a range to cover a majority of said pins and less than all of said pins.

39. The combination with a rotatable valuating member having a series of pins settable to determine the extent of rotation thereof, of a restoring ring for unsetting said pins, having a gap to clear one of said pins and leave said last-mentioned pin set.

40. The combination with a series of numeral keys, of a computing mechanism including a rotatable valuating wheel having a series of pins settable according to the numeral keys actuated to determine the extent of rotation of the wheel, and a restoring ring normally in engagement with said pins when said computing mechanism is silent.

41. The combination with a computing mechanism including a rotatable valuating wheel having a series of pins settable to determine the extent of rotation thereof, of a series of numeral keys, a restoring ring normally in engagement with said pins when said computing mechanism is silent, and means for withdrawing said restoring ring at the striking of a numeral key.

42. The combination with a computing mechanism including a valuating wheel having a series of pins settable to determine the extent of rotation thereof, of a series of numeral keys for controlling the setting of said pins, a restoring ring for said pins, a cam for actuating said restoring ring, and means for controlling the action of said cam from said numeral keys.

43. The combination with a computing mechanism including a valuating wheel having pins settable thereon to determine the extent of rotation thereof, of a series of numeral keys for controlling the setting of said pins, a restoring ring for said pins, a cam normally holding said restoring ring in action, a spring tending to turn said restoring ring out of engagement with said pins, and means for moving said cam away to release said restoring ring at the striking of a numeral key.

44. The combination with a computing mechanism including a valuating wheel having a series of pins settable thereon to determine the extent of rotation thereof, of a series of numeral keys for controlling the setting of said pins, a restoring ring for said pins, a cam for actuating said restoring ring, a shaft for rotating said cam, means for rotating said shaft, and means for controlling the rotation of said shaft from said numeral keys.

45. The combination with a computing mechanism including a valuating wheel having a series of pins settable to determine the extent of rotation thereof, of a series of numeral keys for controlling the setting of said pins, a restoring ring for said pins, automatic means for actuating said restoring ring consequent to a computing action, and manual means for actuating said restoring ring.

46. The combination with a computing mechanism, of a main source of power for driving said computing mechanism, a supplementary source of power for effecting certain functions essential to a computing action by said computing mechanism, numeral keys for controlling the bringing into play of said main source of power and said supplementary source of power, connections enabling said main source of power to reënergize said supplementary source of power subsequent to a computing action by said computing mechanism, and manual means for reënergizing said supplementary source of power in case said main source of power fails to act.

47. The combination with a computing mechanism, of numeral keys for controlling the action of said computing mechanism, locking means brought into play at the actuation of a numeral key to prevent the subsequent actuation of the same or any other numeral key until the computing action started by the actuated numeral key is completed, manual means for silencing said locking means in case said computing mechanism fails to complete a started computation, and means actuated by said manual means for restoring said computing mechanism to its initial condition before the starting of the partially completed computation.

48. The combination with a computing mechanism, of a series of numeral keys for controlling the action of said computing mechanism, locking means for preventing the actuation of any numeral key in case a computation started by the striking of a numeral key has been but partially completed, and manual means for restoring said computing mechanism to its initial condition prior to the starting of the partially completed computation.

49. The combination with a computing head, of a computing mechanism connected to run up computations in said computing head digit by digit, power means for said computing mechanism, a series of numeral keys connected to control the action of said power means so that the number corresponding to the numeral key actuated will be immediately run up into said computing head by said power means, and manually operated restoring means for returning said computing mechanism to its initial condition in case a computation started by the striking of a numeral key is incompletely effected by said power means.

50. The combination with a computing mechanism, of a tripper for controlling the action of said computing mechanism, a series of numeral keys, each capable of actuating said tripper and connected to start said computing mechanism in action, and manual restoring means for returning said computing mechanism to its initial set condition in case of a partially completed computation started by the striking of a numeral key, said restoring means being connected to move said tripper to an ineffective position.

51. The combination with a computing mechanism, of a tripper for controlling the action of said computing mechanism, a manually-operable restorer, and a deflector connected to said restorer so as to be actuated thereby and underlie said tripper so as to silence the same.

52. The combination with a computing mechanism, of a tripper for controlling the action of said computing mechanism, a restorer, a deflector engaging said tripper, and a cam on said restorer for actuating said deflector.

53. The combination with a computing mechanism, of a tripper for controlling the action of said computing mechanism, a restorer for said computing mechanism, a deflector for said tripper, a cam follower on said deflector, and a cam on said restorer engaging said follower to rock said deflector and silence said tripper.

54. The combination with a computing mechanism, of a tripper for controlling the action of said computing mechanism, a restorer for said computing mechanism, a guide for said restorer, a deflector pivotally mounted on said guide and engaging said tripper, a follower on said deflector, and a cam on said restorer engaging said follower to actuate said deflector, so as to silence said tripper.

55. The combination with a computing mechanism, including a series of pins settable to determine the extent of a computation, of a series of numeral keys for selecting the pin to be set, automatic means tripped by said numeral keys for setting the selected pin, and manual means for restoring the selected pin to its normal unset condition and also restoring said automatic means.

56. The combination with a traveling carriage, of a computing head including a series of computing wheels, a master wheel for rotating said computing wheels, said master wheel and said computing head having a relative traveling movement to bring said master wheel *seriatim* into driving relation with each of said computing wheels, computing mechanism for governing the rotation of said master wheel, numeral keys for governing the action of said computing mechanism, automatic locking means brought into play at the striking of a numeral key to lock said carriage against movement and for locking said computing head and said master wheel against a relative movement, automatic means for releasing said locking means, and manual means for releasing said locking means, in case said automatic means fails to act to release the locking means which has been brought into action by a key.

57. The combination with a traveling carriage, of two primary computing elements, to wit, a computing head having a plurality of computing wheels, and a master wheel, said master wheel and said computing head having a relative traveling movement so as to bring said master wheel *seriatim* into driving relation with each of said computing wheels, a lock for preventing a relative movement between said computing head and said master wheel, a lock for preventing a rotation of said master wheel, said locks being alternate in their actions, computing mechanism for controlling the action of said master wheel, automatic means brought into play at the initiation of a computing action by said computing mechanism to render effective said first-mentioned lock and render ineffective said second-mentioned lock, and manual means for releasing said first-mentioned lock and rendering effective said second-mentioned lock.

58. The combination with a traveling carriage, of two primary computing elements, to wit, a computing head having a series of computing wheels, and a master wheel, said computing head and said master wheel having a relative traveling movement so as to bring said master wheel *seriatim* into driving relation with each of said computing wheels, locking means for preventing a relative traveling movement between said computing head and said master wheel, locking means for preventing a traveling movement of said carriage, computing mechanism for governing the action of said master wheel, numeral keys for controlling the action of said computing mechanism, locking means for said numeral keys, automatic means controlled from said computing mechanism for bringing into play all of said locking means so as to prevent relative movement between said computing head and said master wheel, a traveling movement of said carriage and actuations of said numeral keys during a computation, and manual means for releasing at will all of said locking means.

59. The combination with a computing mechanism, of a tripper for controlling the action of said computing mechanism, a series of numeral keys for controlling the action of said tripper and said computing mechanism, and locking means for governing the effectiveness and ineffectiveness of said tripper.

60. The combination with a computing mechanism, of a tripper for controlling the action of said computing mechanism, locking means for preventing the actuation of said computing mechanism, shifting means for said tripper for controlling the effectiveness thereof, and connections enabling an abnormal actuation of said tripper to bring into play said locking means.

61. The combination with a traveling carriage, of an escapement mechanism for controlling the movement of said carriage, including a universal frame and a supporting frame for said universal frame, computing mechanism, numeral keys for controlling the action of said computing mechanism, and locking means for said carriage brought into play at the actuation of a numeral key, to prevent a traveling movement of said carriage by engaging and holding said supporting frame against movement until a started computation has been completed.

62. The combination with a series of settable pins, of interponents for setting said pins, numeral keys for controlling the selection of said interponents, a striker for shifting a selected one of said interponents to set a selected one of said pins, and means for returning said striker immediately after actuating the selected interponent, independently of the return of the key actuated.

63. The combination with a series of settable pins, of a series of interponents for setting said pins, a series of numeral keys each arranged to select an individual one of said interponents to render the same effective, means for actuating a selected interponent to set a selected pin at the actuation of a numeral key, and means for returning said first-mentioned means immediately and independently of the return of the actuated numeral key, so as to clear the selected interponent from the series of pins.

64. The combination with a valuating member having a series of pins settable thereon to determine the extent of movement thereof, of numeral keys for controlling the setting of said pins according to their values, means for driving said valuating member an amount corresponding to the pin set, and numeral-key controlled setting mechanism advancing to set a pin and retiring to a position clear of said pin irrespective of the action of a numeral key subsequent to a down stroke thereof and before said valuating member starts in motion under the impulse of said driving means, said driving means acting automatically to drive said valuating member at the setting of a pin.

65. The combination with a computing mechanism including a series of pins settable to determine the extent of a computation, of setting means for said pins, driving means for said computing mechanism, numeral keys for controlling the bringing into play of both said setting means and said driving means, and actuating means for said setting means acting to advance said setting means to set a selected pin and restore said setting means clear of said pin, said driving means coming into play automatically at the striking of a numeral key whether the same returns or not but subsequently to the setting action and restoring action of said setting means.

66. The combination with a computing mechanism, of a series of numeral keys for controlling the action of said computing mechanism, a normally-silent motor for said computing mechanism brought into play by said numeral keys, and auxiliary mechanism for throwing on said motor the burden of the work initiated by said numeral keys, including that which takes place while said motor is silent, said auxiliary mechanism, including a detent for governing the bringing into play of said computing mechanism, a tripper for said detent having a serrated surface capable of engaging said detent at different points in the movement of said detent, and connections universal to said numeral keys enabling the actuation of said tripper by said numeral keys.

67. The combination with a normally-primed assisting mechanism, of a detent for said mechanism, and a tripper for said detent having a serrated surface capable of engaging said detent at different points in the movement of said tripper.

68. The combination with a normally-primed assisting mechanism, of a detent for said mechanism, a tripper for said detent having a serrated surface capable of engaging said detent at different points in the movement of said tripper, and a silencer for lifting said tripper to a position such that its serrated surface will clear said detent.

69. The combination with valuating mechanism, of numeral keys for controlling the extents of movement of said valuating mechanism to correspond with the values of the numeral keys actuated, and self-acting interponent mechanism effective at the actuation of a numeral key to determine the extent of movement of said valuating mechanism, and withdrawn to a cleared position with respect to said valuating mechanism before the same starts into movement.

70. The combination with a master wheel, of a decimal indexing mechanism for determining the extent of rotation of said master wheel, having definite stopping points, a driving train from said indexing mechanism to said master wheel having a break therein, and a lock having ten positioning points for said master wheel for accurately determining the position of said master wheel with relation to the stopping points of said indexing mechanism when the connection between the two is interrupted.

71. The combination with a master wheel, of a train of gearing for driving said master wheel having two breaks at different points, and a lock for said master wheel controllable in connection with both breaks so as to prevent rotation of the master wheel in case the train of gearing is interrupted at at either point.

72. The combination with indexing mechanism, of a tripper for bringing said indexing mechanism into play, numeral keys for operating said tripper effectively when in an active position, shifting means for controlling the active and inactive positions of said tripper, and silencing means for locking said keys operated from said shifting means at predetermined intervals when the numeral keys could be otherwise active to bring into play said indexing mechanism through an operation of said tripper.

73. The combination with indexing mechanism, of a tripper for bringing said indexing mechanism into play, having active and silent positions, numeral keys for operating said tripper, and locking means operative on said keys at predetermined points when said tripper is in its active position, so as to prevent the action of said indexing mechanism.

74. The combination with a normally-primed computation-initiating mechanism, of numeral keys, connecting means rendering said numeral keys effective to dominate said mechanism by the position of a single element in active and inactive paths of movement, and controlling mechanism having two ways of silencing the dominance of said keys over said computation-initiating mechanism, one by locking said keys, the other by shifting said element to an ineffective position.

75. The combination with a valuating mechanism, of numeral keys for controlling the extents of valuating movements of said valuating mechanism to correspond with the numeral keys actuated, and numeral-key-incited interponent mechanism setting said valuating mechanism in such a way that said valuating mechanism may move free of interference or contact with said interponent mechanism even if a numeral key should be held in its actuated position after the start of said valuating mechanism into movement.

76. The combination with a computing mechanism, including a valuating wheel having a series of pins settable to determine the extent of the computation, of numeral keys for controlling the setting of any of said pins, a restoring means for said pins, driving means for said computing mechanism, means brought into play on the setting of any pin to concomitantly control said driving means and to render said restoring means ineffective, and manual means for operating said restoring means to unset any set pin in case said driving means fails to act at the setting of a pin.

77. In a computing machine, the combination with computing mechanism, of a primary motor for driving said computing mechanism, a switch for said motor, an auxiliary motor for controlling the closing of said switch, numeral keys for controlling the activity of said auxiliary motor to close said switch, means brought into action on the completion of a computation for connecting said primary motor to restore said auxiliary motor to idle position and to thereby control the opening of said switch, and manual means for controlling the opening of said switch through the restoration of said auxiliary motor in case said primary motor fails to act.

78. The combination with a computing mechanism, of numeral keys for controlling the action of said mechanism, locking means normally inactive brought into play at the actuation of a numeral key to prevent subsequent actuation of the same numeral key or any other numeral key until the computing action started by the actuated numeral key is completed, means for moving said locking means to idle position on completion of a computation, and manual means for restoring said locking means to idle position in case said locking means is brought into action by the numeral key but in case the computing mechanism fails to complete the started computation.

79. In a computing machine, the combination with computing mechanism, of a motor for driving said computing mechanism, a series of numeral keys for controlling the amount of drive of said computing mechanism by said motor, and means for enabling the operation of said keys in rapid succession, comprising a clutch for controlling the drive by said motor, a shifter for said clutch, a spring for quickly shifting said clutch, a cam, a finger on said shifter engaging said cam so as to oppose the action of said spring, preventing the closing of said clutch, said cam having an abrupt dip therein, so as to enable said spring to quickly act when said cam is rotated, and means for rotating said cam under control of any of said numeral keys, said finger being pivoted on said shifter to permit a counter-rotation of said cam without disturbing said shifter.

80. The combination with a series of computing wheels, of a master wheel for driving said computing wheels, numeral keys for controlling the extent of rotation of said master wheel, a motor for driving said master wheel, locking means for said master wheel, means brought into action at the actuation of any one of said numeral keys to make said lock ineffective, and means brought into play again to lock said master wheel at the termination of a drive of said master wheel by said motor, irrespective of the subsequent position or movement of the numeral key which enabled the motor to drive the master wheel.

81. The combination with a series of computing wheels, of a master wheel for driving said computing wheels, a normally-interrupted train of connections to said master wheel, numeral keys for controlling the drive of said master wheel by initiating a completion of the train to said master wheel on the down-stroke of any key, locking means for said master wheel, releasing means for said locking means controlled by said numeral keys at the actuation of any one thereof, and means to once more render said locking means effective at the automatic breaking of the connection in said train of connections, while independent of the subsequent position or movement of the numeral key which released the locking means.

82. In a computing machine, the combination with valuating mechanism, of power means for actuating said mechanism, said power means being normally disconnected from said valuating mechanism, numeral keys for controlling the setting of said valuating mechanism, a striker for doing the work of setting said valuating mechanism as selected by said keys, and actuating means for said striker having a movement to drive said striker and release the same, and a further movement to control the connection between said power means and said valuating mechanism.

83. The combination with computing mechanism, of a motor for driving said mechanism, a train of connections between said motor and said computing mechanism, said connections being normally broken and said motor being normally silenced, a master wheel for said computing mechanism, a lock for said master wheel, numeral keys, means controlled from said numeral keys for rendering said motor active, restoring the train of connections between said motor and said computing mechanism, and releasing said lock, and means for maintaining said lock effective if the motor is started in operation but said connections are not rendered effective.

84. In a computing machine, the combination with computing mechanism, of driving means therefor, computation-initiating mechanism for bringing said driving means into action, numeral keys for controlling said computation-initiating mechanism on the operation of any key, and manual means independent of said numeral keys for restoring said computation-initiating mechanism to its normal condition.

85. In a computing machine, the combination with computing mechanism, of driving means therefor, computation - initiating mechanism for bringing said driving means into action, numeral keys for controlling said computation - initiating mechanism, means controlled from said driving means for normally restoring said computation-initiating mechanism to normal condition, and manual means independent of said numeral keys for restoring said computation-initiating mechanism to normal condition.

86. The combination with computing mechanism, of a master wheel for driving said computing mechanism, a lock for said master wheel, means for determining whether said master wheel shall drive said computing mechanism, and means for preventing the release of said lock when said determining means is acting to render said master wheel ineffective.

87. The combination with computing mechanism, of a master wheel for driving said computing mechanism, a lock for said master wheel, means for determining the state of said computing mechanism as to addition, subtraction or neutral, and means preventing the release of said lock when said determining means is in neutral position.

88. In a computing machine, the combination with computing mechanism, of a plurality of numeral keys controlling said mechanism, means controlled by any key for preventing operation of any key while the first key is depressed, a lock for preventing the depressed key or any other key from being operated during a computation, a spring normally untensioned for operating said lock, and means controlled by any numeral key for tensioning said spring.

89. In a computing machine, the combination with computing mechanism, of a master member for said computing mechanism, a traveling carriage controlling the seriatim drive of said computing mechanism by said master member, numeral keys for determining the amount of movement of said master member, means for preventing the operation of any numeral key while one of said keys is in operative position, a lock for preventing operation of the operative numeral key or any other numeral key until the completion of a computation, a spring normally untensioned for moving said lock to effective position, means controlled by any numeral key for controlling said lock, and means controlled from the traveling carriage for also controlling said lock, one of said last-mentioned means acting positively to move said lock to effective position, and the other of said means acting to tension said spring to thereby move said lock to effective position.

GUSTAVE O. DEGENER.

Witnesses:
E. SAUNDERS,
MIRIAM MEAD.